Feb. 16, 1971  B. W. RULE  3,562,889
MACHINE FOR ASSEMBLING LAMINATIONS
Filed Aug. 5, 1968  5 Sheets-Sheet 1

INVENTOR
BASIL WILLIAM RULE
BY
Watson, Cole, Grindle & Watson
ATTORNEY

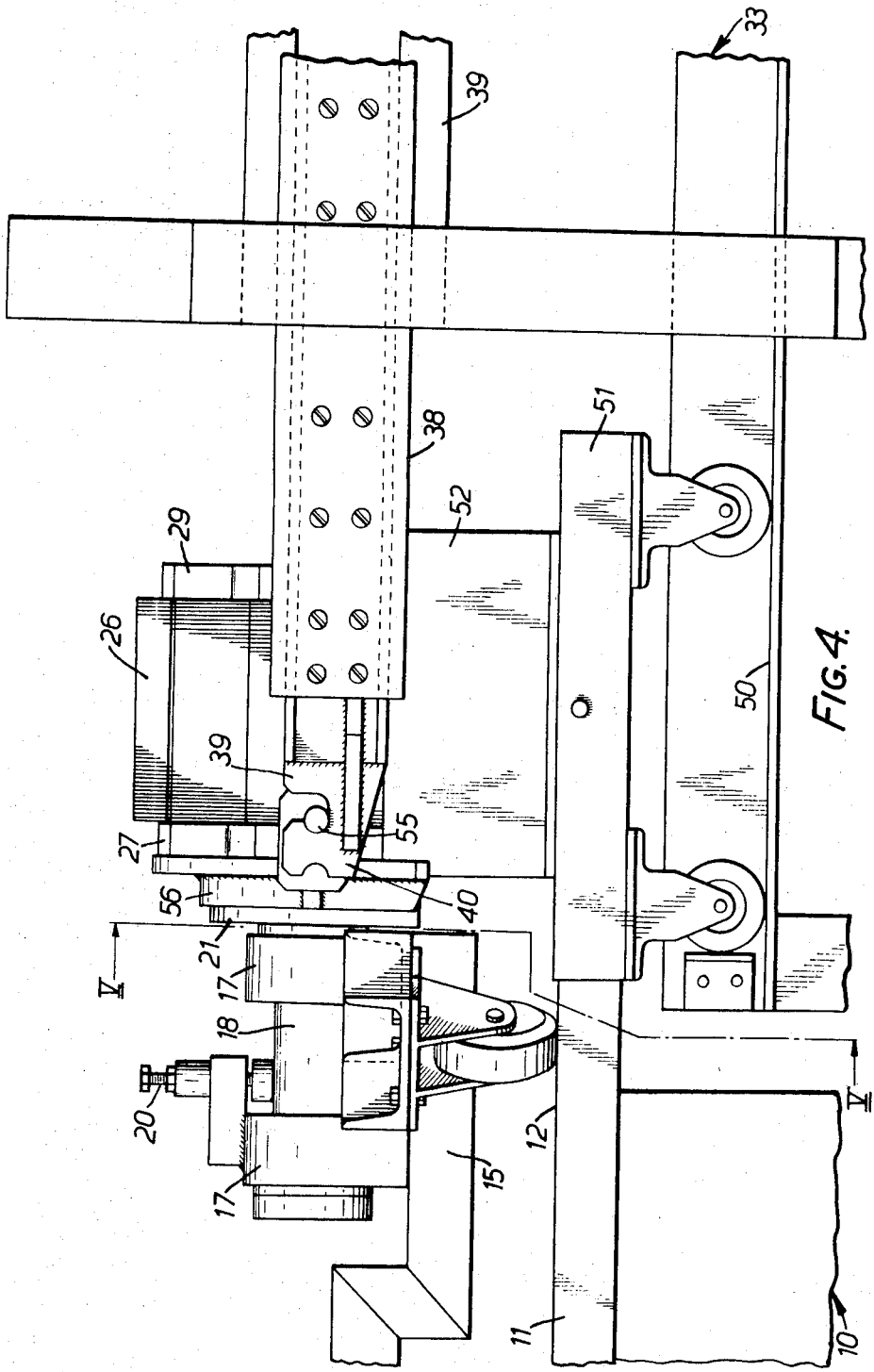

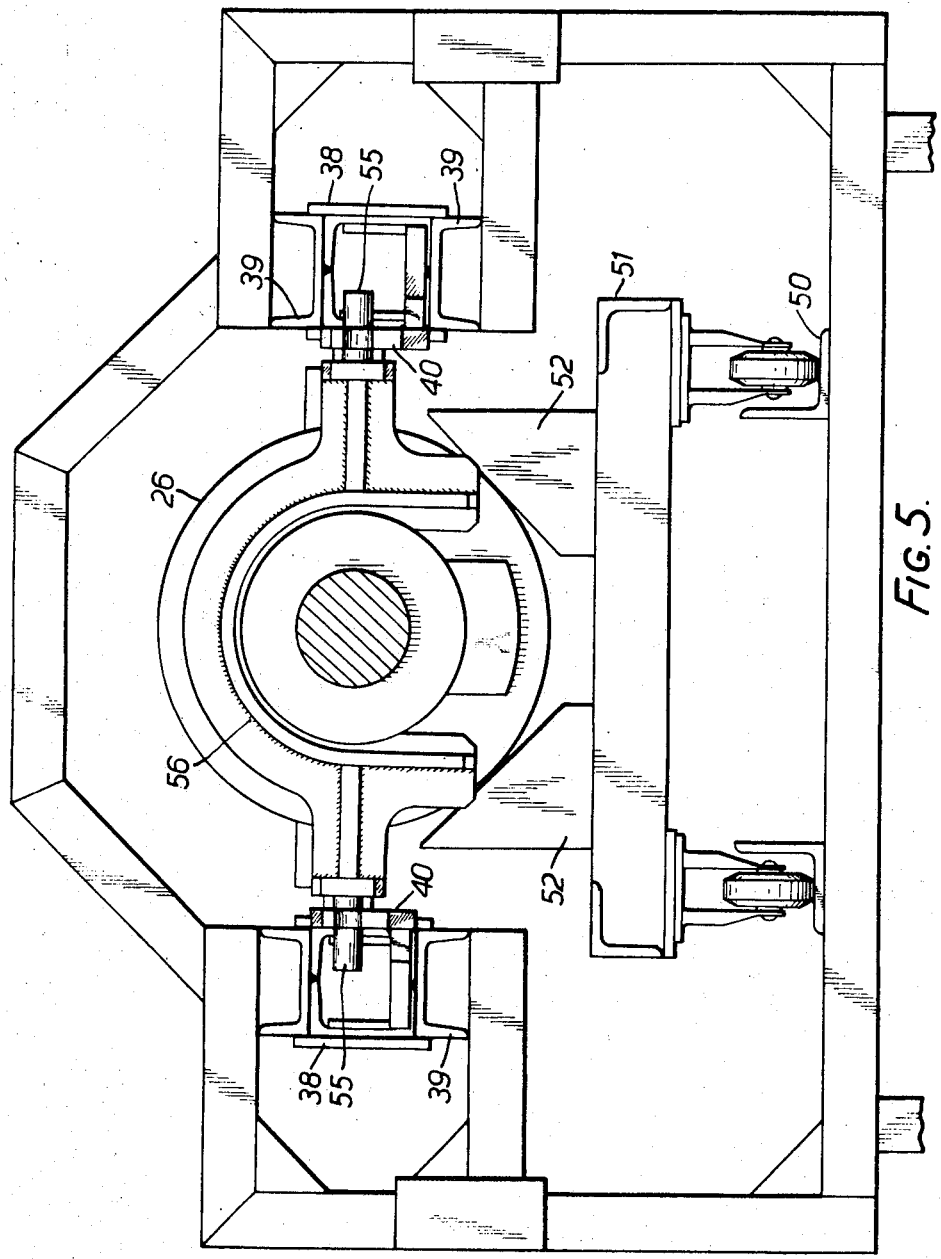

United States Patent Office 3,562,889
Patented Feb. 16, 1971

3,562,889
MACHINE FOR ASSEMBLING LAMINATIONS
Basil W. Rule, Stamford, England, assignor to Newage
Lyon Limited, Stamford, England
Filed Aug. 5, 1968, Ser. No. 750,247
Claims priority, application Great Britain, Aug. 4, 1967,
36,027
Int. Cl. H05k 13/00
U.S. Cl. 29—203
12 Claims

ABSTRACT OF THE DISCLOSURE

The invention relates to an assembly machine or fixture device for assembling stamped iron rotor laminations into a pack, compressing the pack, and holding the pack compressed whilst it is seam-welded together to form the laminated iron rotor core of a dynamo-electric machine. A pedestal provides a circumferential horizontal track around a vertical axis, and a number of trolleys are mounted on the pedestal for movement along the track and around the vertical pedestal axis. Each trolley has bearings in which is journalled a mandrel extending radially with respect to the pedestal axis, the outer end portion of the mandrel projecting beyond the pedestal to constitute a horizontal working portion located at a convenient working height on which a required number of the laminations can be assembled in a pack. The trolley carrying the pack of laminations is then moved along the track to bring its mandrel into alignment with a fixed, horizontal hydraulic or pneumatic ram. The ram has fittings enabling it to be applied to the outer end of the pack of laminations so as to compress the pack axially to the desired extent, when a lock nut is tightened onto the mandrel to engage the pack and hold it compressed to enable the ram to be disengaged. The trolley can then be moved along the track to bring the compressed pack out of alignment with the ram, so that the required seam-welding operations and the fitting of damper bars can be performed on the pack whilst it is supported on the projected end of the mandrel and is retained compressed by the lock nut. Finally the trolley is swung back into alignment with the ram, the lock nut is removed and the ram plunger is coupled to a yoke fitted behind the radially-inner end of the pack, and the ram is operated in reverse to withdraw the completed pack off the mandrel and onto a carrier positioned to receive it.

---

This invention relates to machines or fixing devices for assembling packs of rotor laminations to constitute the iron rotor cores of dynamo-electric machines, for example laminated field rotor cores for salient-pole revolving-field alternators.

It is customary to assemble a salient-pole laminated rotor core by stacking the laminations vertically, compressing the assembled vertical stack, fitting copper damper bars in aligned holes in the stack, and seam-welding or brazing the laminations together along the slots of the compressed stack. This process however gives rise to awkward working conditions, particularly in the seam-welding stage.

According to the present invention an assembly machine or fixture device for use in the production of seam-welded rotor lamination packs for dynamo-electric machines comprises one or more horizontal or near-horizontal mandrels each journalled in bearings in a supporting cradle from which one end portion of the mandrel projects to constitute an overhanging working portion on which a pack of laminations may be assembled together at a convenient working height, and power-actuated ram means operable to compress the assembled pack of laminations carried by the overhanging working portion of the mandrel.

When the lamination pack has been compressed axially to the desired extent it may be locked in the compressed state by means such as a locking nut fitted to the mandrel, and the ram retracted, and the compressed pack can then be turned by hand together with the mandrel about the generally horizontal pivotal axis of the mandrel into successive angular positions convenient for the performance of the seam welding or brazing operations in the slots of the pack. After welding or brazing has been completed and any damper winding has been fitted, the ram may then be used in reverse to withdraw the completed rotor pack from the mandrel onto a trolley or other carrier.

The invention thus facilitates the performance of the various assembly operations under convenient working conditions made possible by the horizontal orientation of the axis of the lamination pack mounted on the overhanging mandrel in a manner such that it may be easily revolved, providing each access at a suitable working height for the welding or brazing operations, and reduces the handling of the heavy and cumbersome rotor packs to a minimum.

In one form of the invention the assembly machine or fixture device comprises a floor-mounted pedestal affording a circumferential track on which a number of trolleys constituting the mandrel cradles are movably mounted and are guided for individual movement along the track around a vertical axis at the centre of the pedestal, the mandrels being rotatably mounted on the trolleys so as to extend radially with their overhanging working end portions projecting outwardly beyond the pedestal, so that a pack of laminations may be assembled on each of the overhanging working mandrel portions, and also includes a floor-mounted ram structure incorporating a hydraulic or pneumatic ram whose axis of operation is radial with respect to the vertical axis of the pedestal and which is provided with fittings enabling it to be applied to each lamination pack in turn when the mandrel supporting that pack is moved on its trolley into a position aligned with the ram, whereby the ram may be employed to compress the aligned pack or to strip it from the mandrel.

The invention may be carried into practice in various ways, but one specific embodiment will now be described by way of example only with reference to the accompanying drawings, in which:

FIG. 4 is a detail view showing in side elevation the ram slide positioned and the withdrawal yoke fitted for withdrawing a completed rotor pack from the mandrel, and FIG. 5 is a section on the line V—V of FIG. 4.

The illustrated embodiment comprises an assembly machine or fixture device for the production of laminated rotor core packs for salient-pole revolving-field alternators, the completed rotor packs being between 8 and 13 inches in diameter, between 4 and 12 inches in axial length, and weighing up to 400 lbs.

Figure 1:
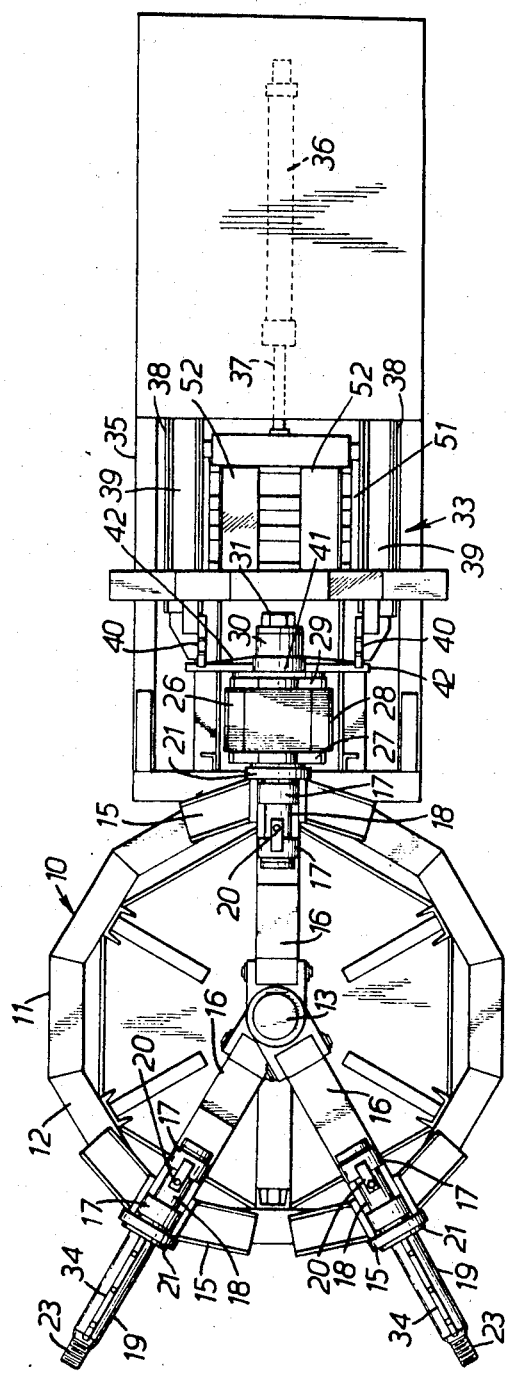
FIG. 1 is a plan view of an assembly machine for rotor lamination packs.
Figure 2:
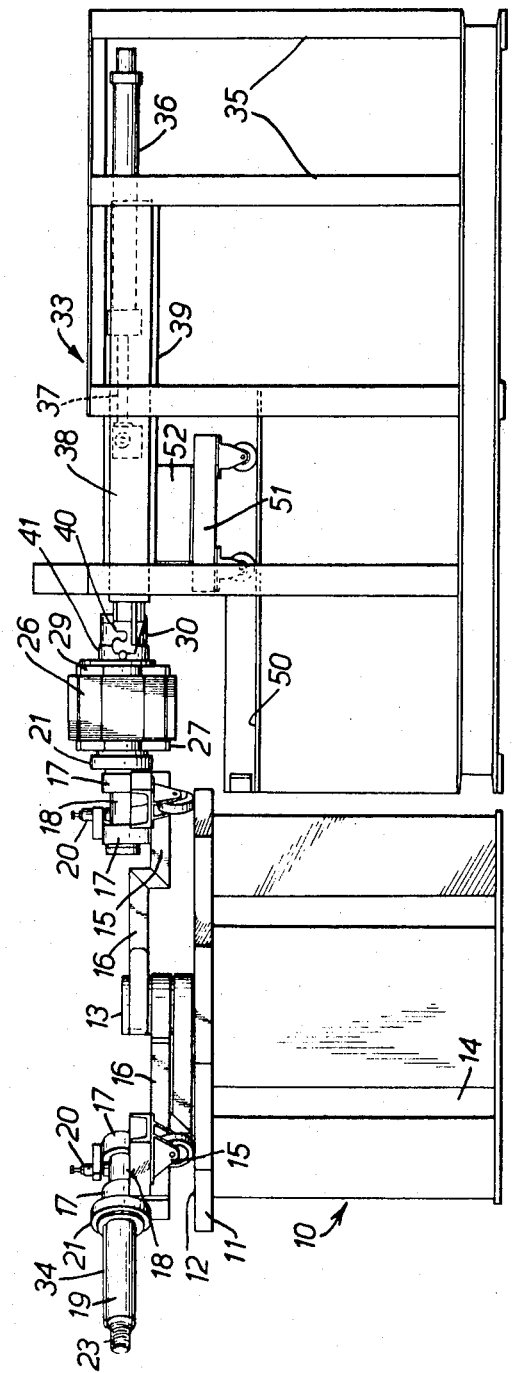
FIG. 2 is a side elevation of the machine.
Figure 3:
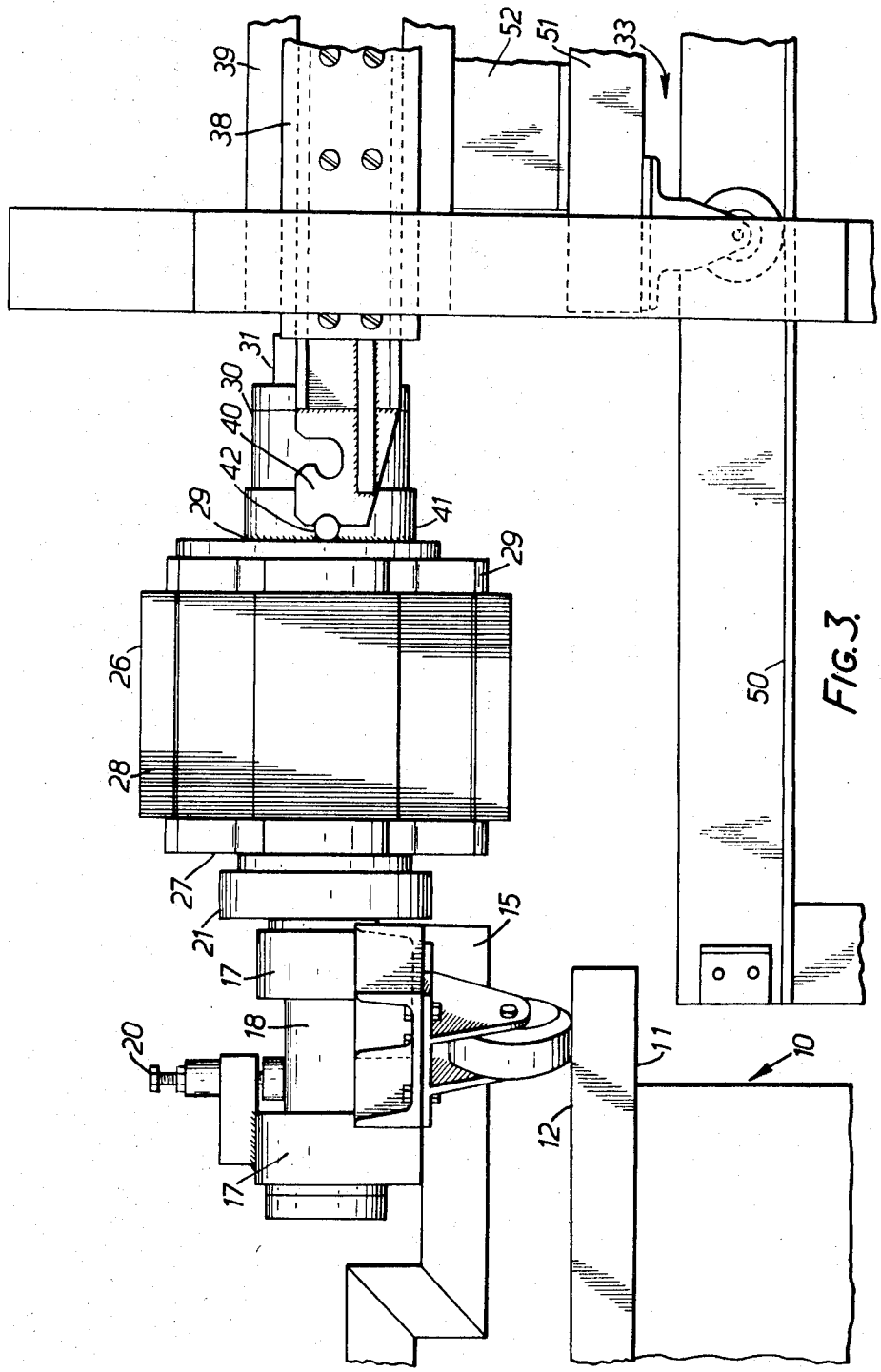
FIG. 3 is a detail view showing in side elevation the forked ram slide in its position for compressing a stack of laminations on one of the mandrels.

As shown in FIGS. 1 and 2 the assembly machine or fixture comprises a floor-mounted pedestal 10 of frame construction provided with a twelve-sided top ring 11 which affords a continuous circumferential horizontal track 12 around a central vertical column 13 mounted within the pedestal frame 14. A number of separate two-wheel trolleys 15, in this case three, ride on the circumferential track 12 and each trolley 15 is attached to the outer end of a radial arm 16 whose inner end is journalled on the central column 13, so that the trolleys can be moved independently along the track 12 around the central column 13. Each trolley 15 carries a pair of spaced coaxial bearings 17 in which the inner end of a horizontal steel mandrel 18 is journalled, the mandrel projecting radially outwardly beyond the bearings so that its outer working end portion 19 overhangs beyond the pedestal 10. A manually-operable friction clamp 20 is provided for locking the mandrel 18 in any required angular position in the trolley bearings 17, and a rigid collar 21 is secured around the central part of the mandrel 18 just beyond the outer trolley bearing 17, to act as a thrust block. The outer end of the mandrel is screw threaded as at 23.

On the outer working portion 19 of each mandrel 18 a required number of steel laminations can be threaded between two copper end laminations, to form a rotor pack 26. First a heavy steel pressure plate 27 is threaded onto the mandrel portion 19, then the pack of copper and steel laminations 28 are threaded on, and finally a second pressure plate 29 is threaded onto the mandrel followed by a tubular steel spacer sleeve 30 and a steel locking nut 31 which is screwed onto the screwthreaded outer end portion 23 of the mandrel. All this assembly work is done at a convenient working height on the overhanding working portion 19 of the horizontal mandrel, and when the assembly work is completed the trolley 15 can be moved round on the top ring 11 to bring the assembled rotor pack 26 supported on its mandrel into the position shown in FIGS. 1 and 2 in line with a hydraulic ram fixture 33 for compressing the pack of laminations.

For assembly of large packs of rotor laminations, each of the mandrels 18 has a straight key 34 on the working end portion 19, and this key locates within keyways in the laminations 28. On small packs a skew-angle has to be accurately set. This is achieved by angularly off-setting one of the pressure plates 27, 28 by the given skew-angle relative to the other plate, and setting the pack 26 skew to this angle by the use of suitable stops and setting bars.

The hydraulic ram fixture 33 comprises a floor-mounted rigid framework 35 in which is mounted a horizontal hydraulic ram 36, the movable ram plunger 37 being directed towards the pedestal 10 with the axis of operation of the ram radial to the vertical axis of the pedestal column 13. For the sizes of rotor pack assembly referred to above the ram 36 would have a stroke of 20 inches and be capable of applying a compressive thrust of 2.4 tons on the pack of laminations, and of applying a stripping pull of 1.7 tons. The ram plunger 37 is coupled to a horizontal slide 38 mounted in a fixed slideway 39 and having a forked outer end with fittings 40 at the extreme ends of the two prongs of the fork. The ram 36 and its slide 38 are located at the same horizontal level as the mandrels 18 on the pedestal 10, so that when any one of the mandrels 18 is moved round on its trolley 15 into a position aligned with the ram 36 and a collar 41 carrying a pair of diametrically-opposed radial thrust bars 42 is fitted over the sleeve 30 against the outer pressure plate 29 of a pack of laminations 26 assembled on the working portion 19 of the mandrel, the ram 36 can be extended until the prong fittings 40 of the forked slide 38 engage the thrust bars 42 and transmit the thrust of the ram to the pressure plate 29. In this way the ram 36 compresses the pack of laminations 26 to a predetermined axial length between the two pressure plates 27 and 29 against the reaction of the fixed sleeve 21 on the mandrel 18. The final pack length is set by locking with the locking nut 31 and spacer sleeve 30. When this has been done the ram is retracted, leaving the compressed lamination pack 26 free to rotate with the mandrel 18 on the trolley 15. The required number of copper damping bars are now assembled by being tamped through registering peripheral holes in the laminations 28, the steel laminations are seamwelded together with two weld runs in each rotor slot, and the copper damper bars are brazed to the copper end laminations. During the operations of assembling the damper bars and welding and brazing the pack 26, the whole pack 26 is turned with the mandrel 18 about the horizontal pivotal axis of the latter from time to time as required to bring the successive parts of the pack into conveniently accessible working positions, and the mandrel 18 is locked by means of the brake 20 to hold these positions while the work is being performed.

The ram fixture 33 also provides a horizontal track 50 on which runs a movable unloading trolley 51. The unloading trolley 51 comprises a wheeled platform which can be rolled out along the track 50 to underlie a completed rotor pack 26 on its aligned mandrel 18, and which carries a pair of transversely-movable support blocks 52 having oppositely angled upper faces, which blocks 52 can be adjusted transversely to suit any pack diameter required, and provide adjustable height and width of support and a centralising facility. When the collar 41, the locking nut 31 and spacer sleeve 30 and the outer pressure plate 29 have been removed from the working end portion 19 of the aligned mandrel 18 and the unloading trolley 51 has been rolled out beneath the completed rotor pack assembly 26 and adjusted into supporting contact therewith, the ram 36 is extended once again until the two prong fittings 40 of the slide fork 38 extend past opposite sides of the rotor pack 26 and can be coupled to the two trunnions 55 of a separate yoke plate 56 (FIGS. 4 and 5) which is applied over the mandrel collar 21 directly behind the inner pressure plate 27. The ram 36 is now retracted again to cause the yoke plate 56 to pull the completed rotor pack 26 off the mandrel 18, leaving the pack 26 supported on the unloading platform 51, from which the completed rotor pack 26 can be lifted aside by means of an overhead hoist. Another loose assembly of laminations 28 on the mandrel 18 of another trolley 15 can then be swung round into alignment with the ram structure for compression and welding up of a further lamination pack 26.

It will be seen that the specific embodiment described and illustrated provides a method and apparatus by which large laminated rotor packs, which are heavy and cumbersome items, can be produced with a substantial reduction of handling, under easy working conditions made possible by the horizontal rotary mounting of the packs which facilitates the assembly and the welding and brazing operations. The whole cycle of building, assembly, welding and brazing is completed on the one single assembly machine or fixture, and the supporting of the lamination packs on the overhanging ends of the journalled horizontal mandrels enables the packs to be readily rotated by hand to present easy access and correct working height for the welding and brazing operations.

Correct compression loading is made possible by the use of the horizontally-acting hydraulic ram which is an integral part of the assembly machine, and the same ram is employed to effect ready removal of the compressed packs from the mandrels. The use of the adjustable unloading trolley further facilitates the handling of the rotor packs for unloading and removal from the assembly area.

The provision of three (or some other number of) mandrels and mandrel trolleys enables the production operation to be broken down and performed by a number of operators equal to or less than the number of mandrels, whereby the production of the rotor packs can be performed with considerable economy of time.

What I claim as my invention and desired to secure by Letters Patent is:

1. An assembly machine for use in the production of welded lamination packs for use as rotors of dynamoelectric machines, which comprises at least one cradle in which is journalled a generally-horizontal mandrel, one end portion of the mandrel projecting beyond the cradle to constitute an overhanging working portion on which a pack of laminations may be assembled together, and power-actuated ram means operable to compress the assembled pack of laminations carried by the overhanging working portion of the mandrel.

2. An assembly machine as claimed in claim 1 including locking means for locking the lamination pack in the compressed state on the mandrel.

3. An assembly machine as claimed in claim 2 including means for utilising the hydraulic ram in reverse operation to withdraw a completed lamination pack from the mandrel onto a carrier.

4. An assembly machine as claimed in claim 1 in which the cradle is mounted for movement along a track, and in which the ram means is mounted on a fixed structure alongside the track, the cardle being movable along the track into a position in which the overhanging portion of its mandrel is adjacent to and in alignment with the ram means.

5. An assembly tool as claimed in claim 4 which comprises a floor-mounted pedestal having a vertical axis of symmetry and having a circumferential horizontal track a number of trollies movably mounted on the pedestal and each constituting one of the said cradles, the mandrels being rotatably mounted on the trollies and the trollies being guided for individual movement along the track and around the vertical axis of symmetry of the pedestal so that the mandrels always extend radially with respect to the said pedestal axis with their overhanging working end portions projecting outwardly beyond the pedestal, and in which the power-actuated ram means comprises a floor-mounted ram structure incorporating a fluid-pressure-actuated ram whose axis of operation is radial with respect to the said vertical axis of the pedestal, the ram having fittings adapted to engage the ram with each lamination pack in turn when the mandrel supporting that pack is held in its trolley in a position aligned with the ram, to permit the ram to be employed to compress the aligned pack or to strip it from the mandrel.

6. An assembly machine as claimed in claim 5 in which the fixed ram structure includes a horizontal slideway carrying a fork slide to which the ram plunger is connected and whose radially-inner fork ends carry the fittings for application to the lamination pack.

7. An assembly machine as claimed in claim 6 including a thrust member adapted to be detachably mounted on the overhanging portion of the mandrel against the outer end of a lamination pack carried thereby, the thrust member having oppositely-directed radial projections against which the fittings on the forked slide bear to apply the compressive thrust of the ram to the lamination pack.

8. As assembly machine as claimed in claim 5 including a withdrawal yoke member adapted to be detachably mounted on the mandrel behind the inner end of a lamination pack carried thereby, the withdrawal yoke having oppositely-directed radial projections for engagement by the fittings on the forked slide to apply the reverse thrust of the ram to the lamination pack for withdrawing it from the mandrel.

9. An assembly machine as claimed in claim 4 in which the floor-mounted ram structure includes a horizontal track positioned below the level of the horizontal axis of the ram and extending parallel thereto, and a withdrawaly carriage arranged to run along the track and adapted to be moved into a position underlying a lamination pack on the overhanging end of an aligned mandrel for the purpose of receiving and supporting the lamination pack during and after its withdrawal from the mandrel by the ram.

10. An assembly machine as claimed in claim 9 in which the withdrawal carriage is mounted on wheels which roll along the track and is provided with carrier members having inwardly-inclined faces arranged to support the underside of a lamination pack beneath which the trolley is positioned, the carrier members being located side-by-side on both sides of the axis of movement of the carriage along the track and being adjustable both vertically and transversely to the said axis of movement.

11. An assembly machine as claimed in claim 5 in which the pedestal includes a vertical column coaxial with the vertical axis of symmetry of the pedestal, and in which each trolley is coupled to the column by means of a radial arm whose inner end is pivoted to the column about the said vertical axis.

12. An assembly machine as claimed in claim 5 in which each mandrel is provided with friction clamping means for preventing its rotation about its own axis in its journal bearing.

References Cited
UNITED STATES PATENTS

| | | | |
|---|---|---|---|
| 1,608,715 | 11/1926 | Barr | 29—205 |
| 2,199,623 | 5/1940 | Elsey | 29—205 |

THOMAS H. EAGER, Primary Examiner

U.S. Cl. X.R.

29—205